United States Patent
Lee

(10) Patent No.: US 8,960,084 B2
(45) Date of Patent: Feb. 24, 2015

(54) JUICE EXTRACTOR WITH A TEMPERATURE DISPLAYING FUNCTION

(76) Inventor: Wen Ching Lee, Taichung (TW)

(*) Notice: Subject to any disclaimer, the term of this patent is extended or adjusted under 35 U.S.C. 154(b) by 240 days.

(21) Appl. No.: 13/635,983

(22) PCT Filed: Mar. 18, 2011

(86) PCT No.: PCT/CN2011/071945
§ 371 (c)(1),
(2), (4) Date: Sep. 19, 2012

(87) PCT Pub. No.: WO2011/120386
PCT Pub. Date: Oct. 6, 2011

(65) Prior Publication Data
US 2013/0008322 A1    Jan. 10, 2013

(30) Foreign Application Priority Data
Mar. 30, 2010  (CN) .................... 2010 2 0144788 U

(51) Int. Cl.
*A23P 1/08* (2006.01)
*A47J 43/07* (2006.01)
*G01K 1/02* (2006.01)

(52) U.S. Cl.
CPC .............. *A47J 43/0716* (2013.01); *G01K 1/02* (2013.01); *G01K 2207/06* (2013.01); *G01K 2207/08* (2013.01)

USPC .............. 99/493; 99/485; 99/506; 219/494; 219/506

(58) Field of Classification Search
CPC ........ A47J 43/0716; A47J 31/56; G01K 1/02; G01K 2207/08; A23N 1/02; A23N 1/00; A23N 2/04; A23N 19/02; H05B 1/02; H05B 3/02; H05B 1/00; H05B 1/0258
USPC ............ 219/493, 494, 497, 506; 99/493, 485, 99/506
See application file for complete search history.

(56) References Cited

U.S. PATENT DOCUMENTS

| | | | |
|---|---|---|---|
| 4,109,314 A * | 8/1978 | Meyer et al. | 702/23 |
| 4,665,816 A * | 5/1987 | Waters et al. | 100/38 |
| 8,403,555 B2 * | 3/2013 | Wu | 366/205 |
| 2012/0269936 A1 * | 10/2012 | Claesson et al. | 426/231 |

* cited by examiner

*Primary Examiner* — Mark Paschall
(74) *Attorney, Agent, or Firm* — Rosenberg, Klein & Lee

(57) ABSTRACT

A juice extractor with a temperature displaying function includes a body and a temperature display device. The body includes a base and a container. A cover is mounted on a top end of the container. The temperature display device is mounted to the body and includes a temperature detecting portion and a display. The temperature detecting portion is connected to the display via a signal transmission route. A temperature change in the container during operation of the body can be known by the temperature display device.

3 Claims, 6 Drawing Sheets

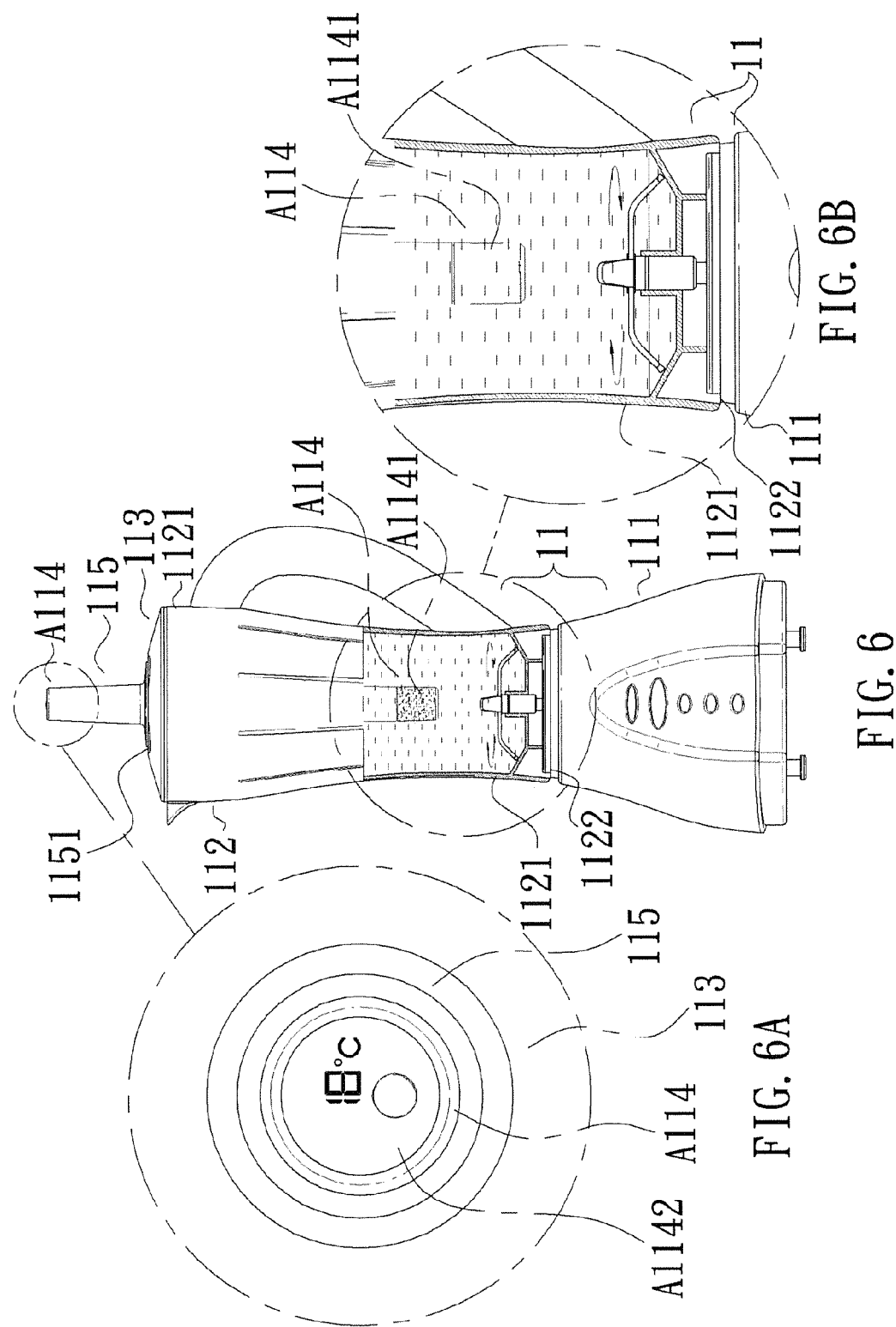

JUICE EXTRACTOR WITH A TEMPERATURE DISPLAYING FUNCTION

BACKGROUND OF THE INVENTION

The present invention relates to a juice extractor with a temperature displaying function and, more particularly, to a juice extractor capable of showing an operator a temperature change in the juice extractor during use.

Juice extractors can mince and mix food materials, such as vegetables, beans, or combinations thereof, into a paste to obtain the juices. The juices can be diluted by adding water or mixed with flavoring before drinking. Use of the juice extractors becomes popular due to the trend of preference for bio food for heath purposes by more people.

Juice extractors can be conveniently used to provide the nutrients in the food materials for people that can not chew well, such as babies, patients, or the old. However, it takes a longer time to mince the food materials when using a juice extractor having a small horsepower. The motor of the juice extractor generates heat during the long-term operation. Heat is also generated by the friction between the cutter blades and the food materials in the juice extractor. Thus, the temperature in the container of the juice extractor can rise to an extent destroying the nutrients and adversely affecting the taste of the food materials. As a result, the drinker can not obtain the main nutrients in the food materials.

In brief, it is desired to know the temperature change in the container of the juice extractor that operates for a longer period of time, so that the operator can stop or pause operation of the juice extractor to avoid destruction of the nutrients in the food materials by high temperature.

BRIEF SUMMARY OF THE INVENTION

In view of the disadvantages of the prior art, the inventor deems improved structure is needed and designs a juice extractor with a temperature displaying function. The juice extractor includes a body and a temperature display device. The body includes a base and a container. A cover is mounted on a top end of the container. The temperature display device is mounted to the body and includes a temperature detecting portion and a display. The temperature detecting portion is capable of detecting a temperature in an interior of the container. The display is mounted to an outer surface of the body. The temperature detecting portion is connected to the display via a signal transmission route.

The advantages of the present invention are that when food materials are placed into the juice extractor for extracting the juice through mincing and mixing, through the help of the temperature display device according to the present invention, an operator can know the temperature increase in the container due to the heat generated as a result of long-term operation or umpteenth use, such that the operator knows when to stop operation to remove the juice or to pause the operation and restart operation after the temperature in the container is reduced. Thus, destruction of the nutrients in the food materials or adverse affect to the taste of the food materials by the high heat is avoided. The drinker drinking the juice can obtain the required nutrients.

DESCRIPTION OF THE DRAWINGS

FIG. 6 is a side view of the juice extractor, with the temperature detection device displaying the temperature.

| Reference numbers: | | |
| --- | --- | --- |
| 1 juice extractor | 11 body | 111 base |
| 112 container | 1121 peripheral wall | 1122 bottom wall |
| 113 cover | 1131 through-hole | 1132 recessed portion |
| 114 temperature display device | 1141 display | |
| A114 temperature display device | A1141 temperature detecting portion | |
| A1141 display | 115 rod | 1151 annular flange |

DETAILED DESCRIPTION OF THE INVENTION

The structure, features, and embodiments of the present invention will be described with reference to the drawings to better understand the present invention.

Figure 1:
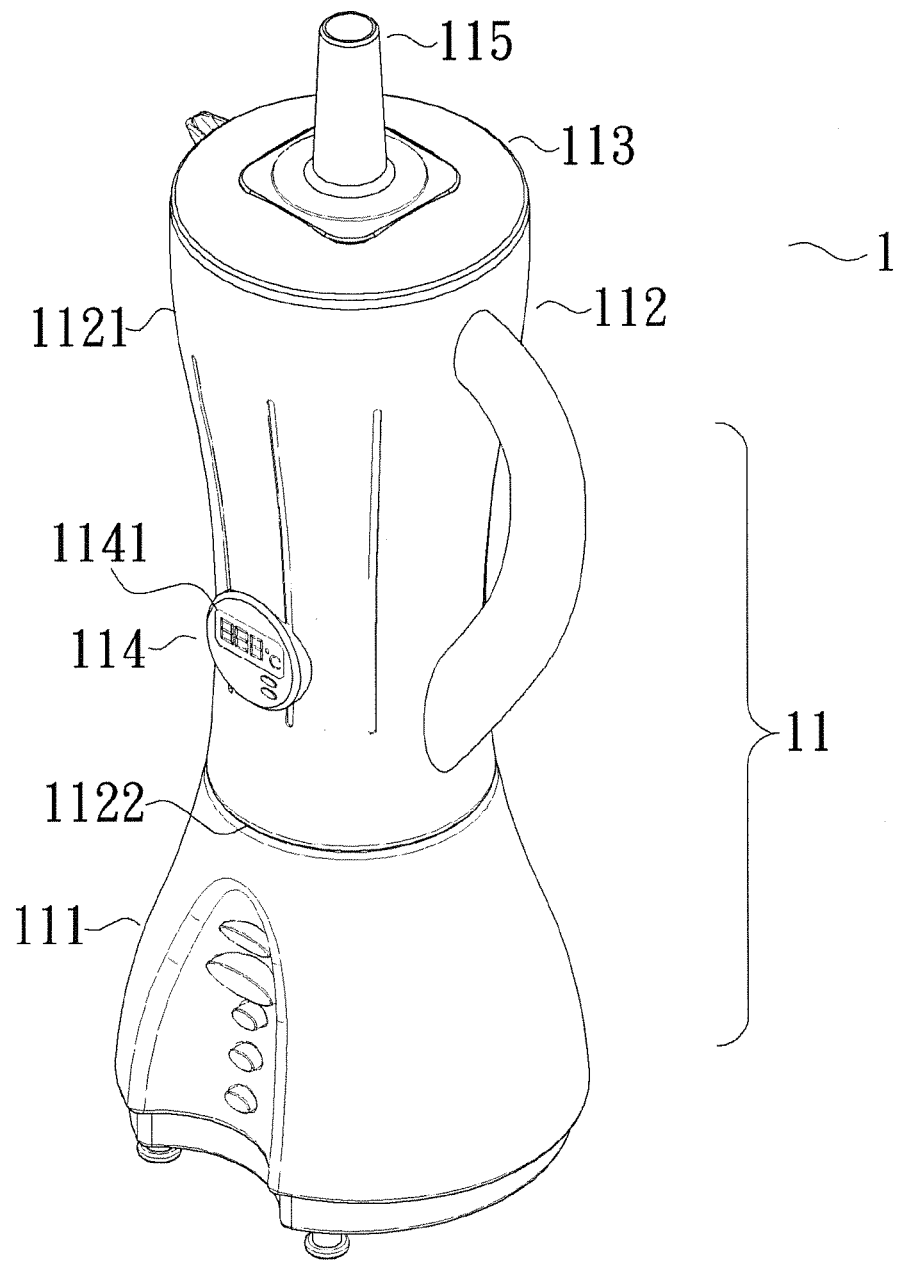
FIG. 1 is a perspective view of a juice extractor according to the present invention having a temperature detection device mounted to a container of the juice extractor.

With reference to FIG. 1, a juice extractor 1 with a temperature displaying function according to the present invention includes a body 11 and a temperature display device 114. The body H includes a base 111 and a container 112. A cover 113 is mounted on a top end of the container 112. The temperature display device 114 is mounted to the body 11 and includes a temperature detecting portion (not shown) and a display 1141. The temperature detecting portion is connected to the display 1141 via a signal transmission route.

Figure 2:
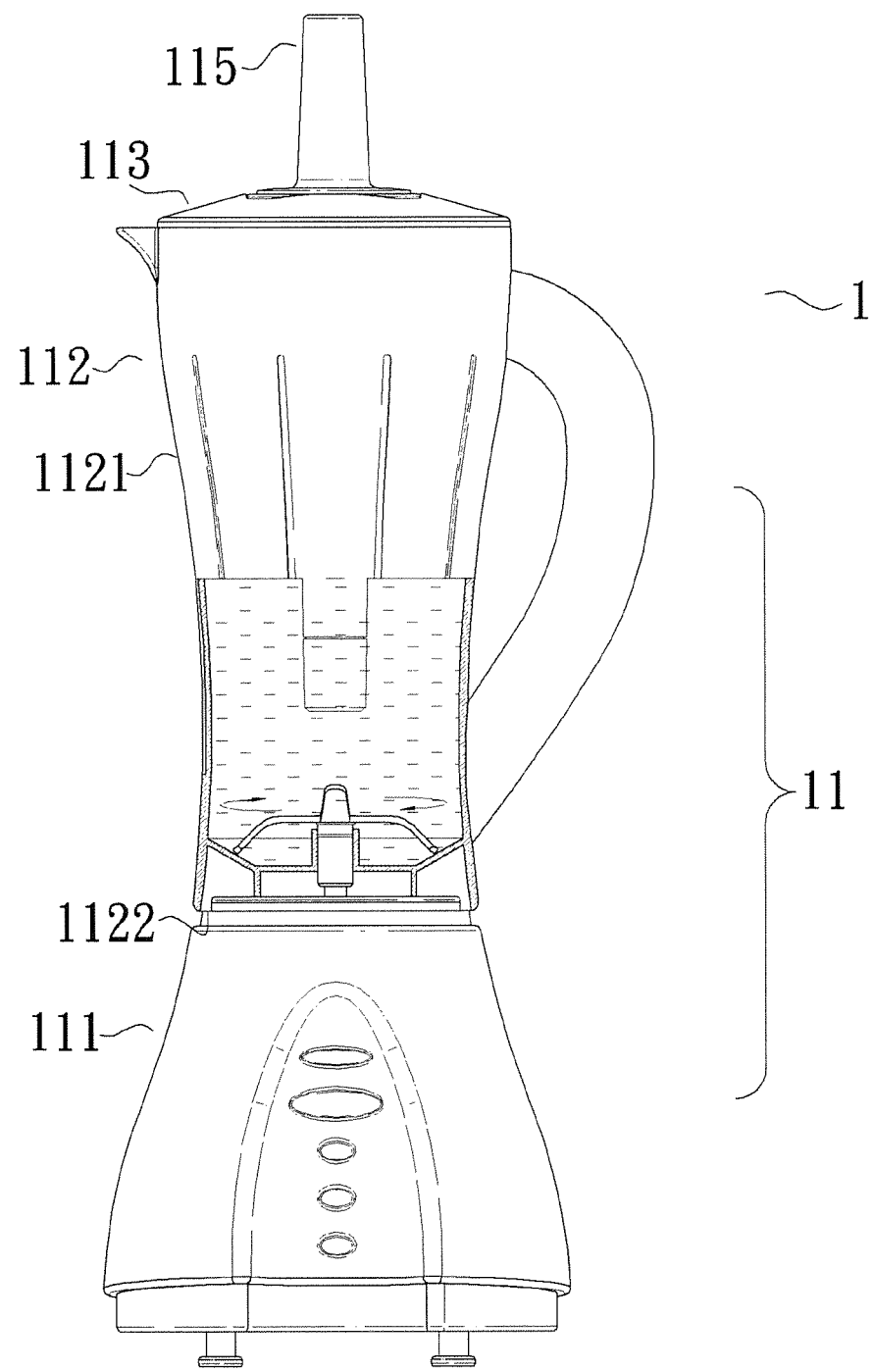
FIG. 2 is a side view of the juice extractor according to the present invention, illustrating operation of the juice extractor.
Figure 3:
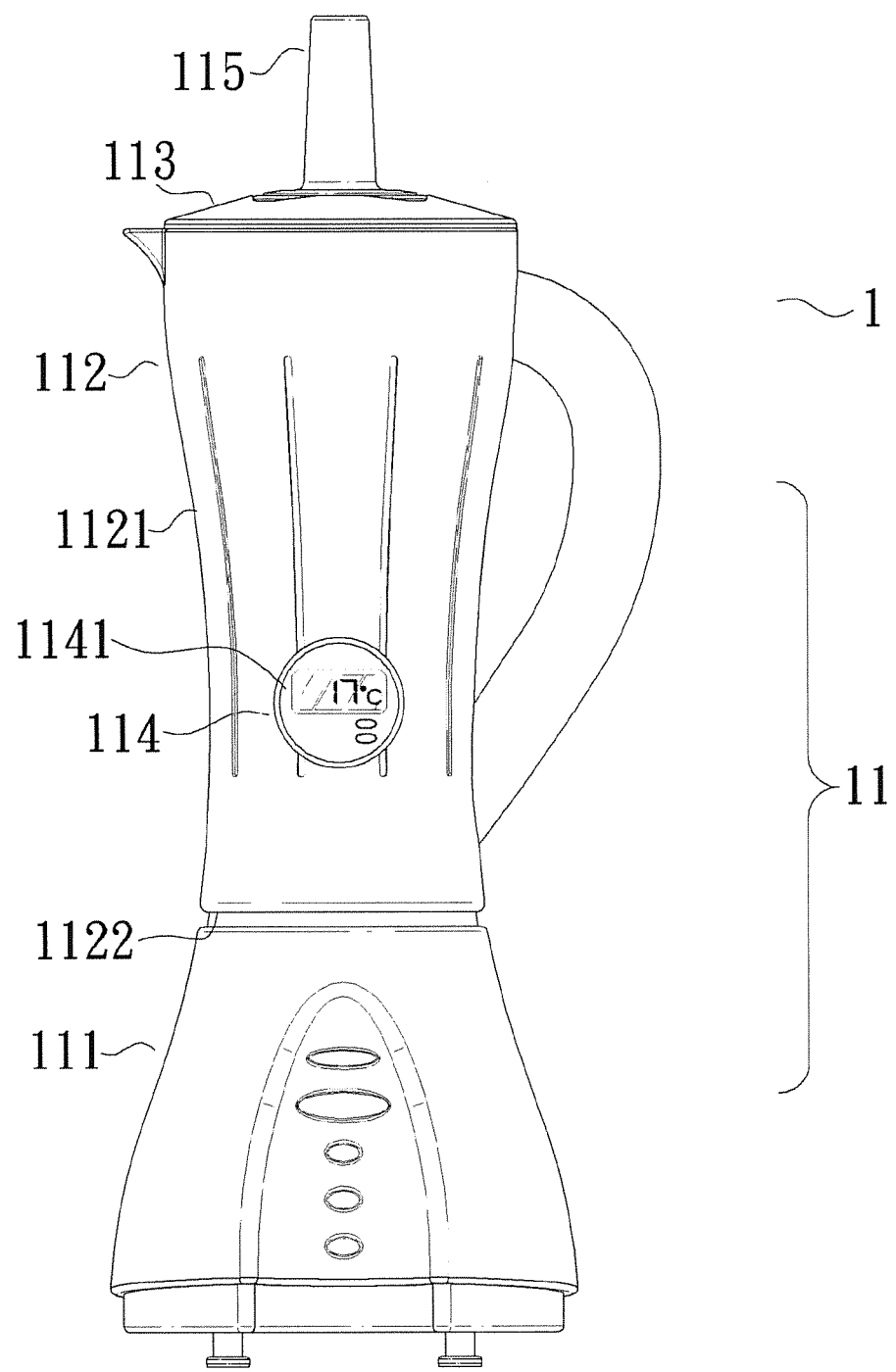
FIG. 3 shows a side view of the juice extractor according to the present invention, with the temperature detection device on the container displaying the temperature.

FIGS. 1-3 show an embodiment for detecting the temperature in the container 112, wherein the temperature display device 114 is mounted to the container 112. The container 112 includes a peripheral wall 1121 and a bottom wall 1122. The temperature detecting portion (not shown) is mounted to an inner surface of the peripheral wall 1121, and the display 1141 is mounted to an outer surface of the peripheral wall 1121. An operator can put food materials into the container 112 and start the juice extractor 1 to mince and mix the food materials into a paste. In a case that a longer period of time for mixing is required, the heat generated by the body 11 or the high temperature due to umpteenth use of the juice extractor 1 causes an increase in the temperature in the container 112. Nevertheless, the operator can know the temperature change in the container 112 by the display 1141. The operator can stop operation of the juice extractor 1 or pause operation and then restart operation after the temperature is reduced. Thus, destruction of the nutrients in the food materials in the container 1 or adverse affect to the taste of the food materials by the high heat is avoided.

Figure 4:
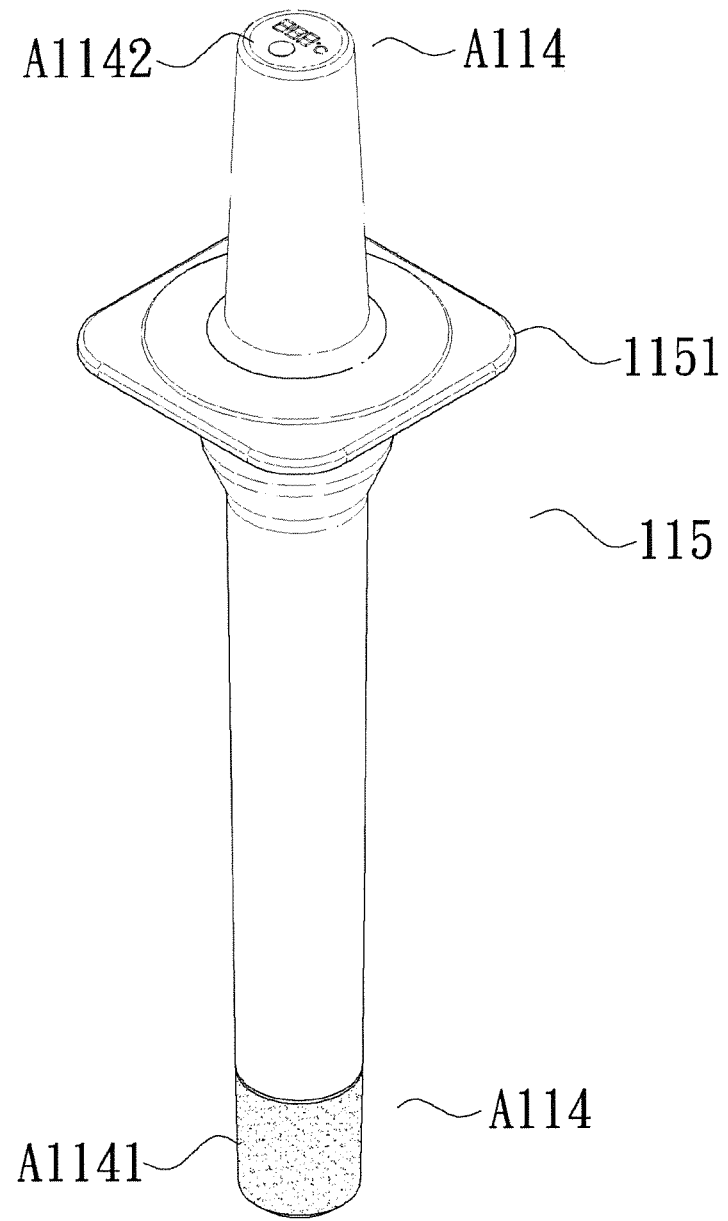
FIG. 4 is a perspective view of a temperature detection device according to the present invention mounted to a rod.
Figure 5:
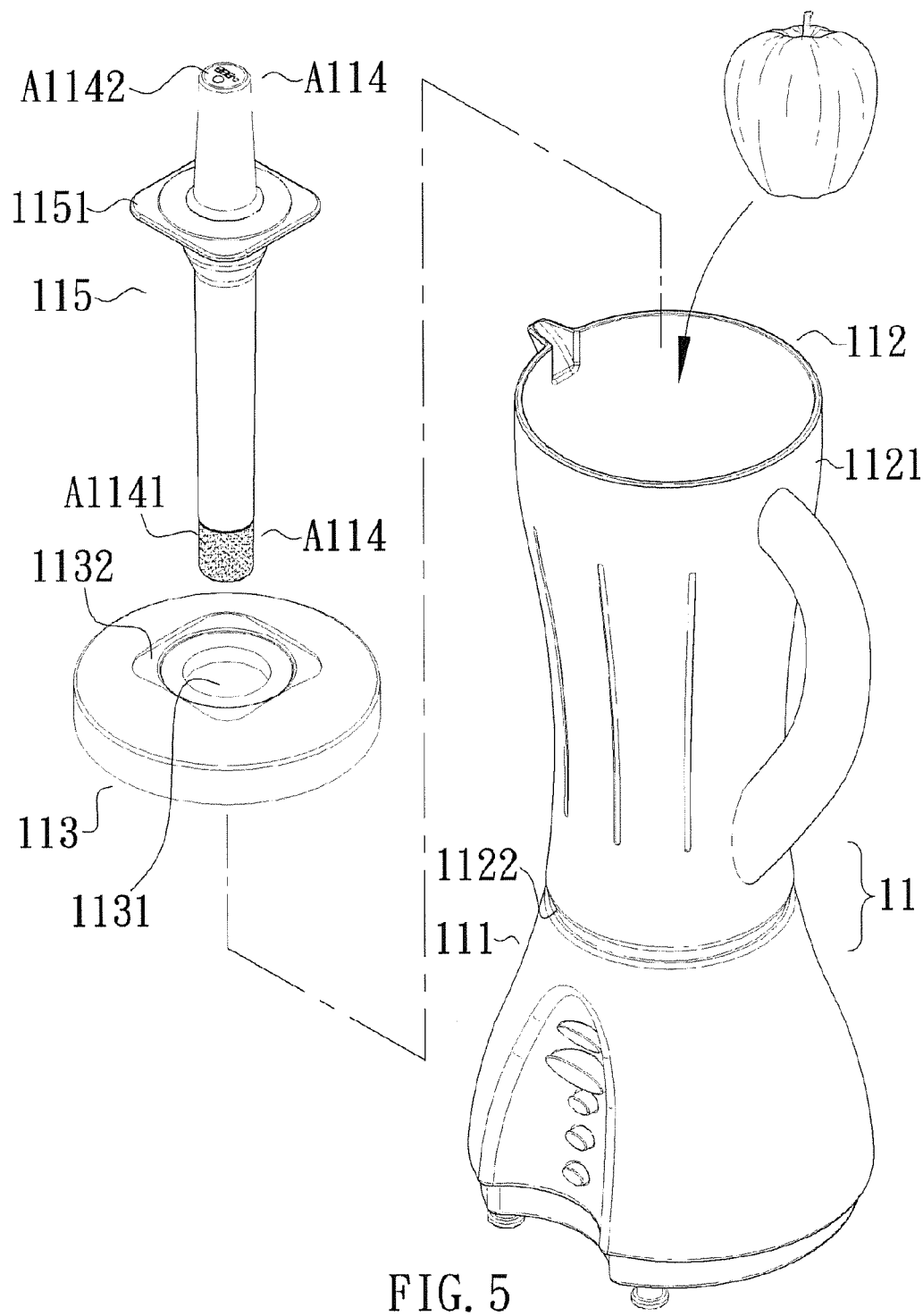
FIG. 5 is an exploded, perspective view of a juice extractor using the rod and the temperature detection device.

FIGS. 4-6 illustrate another embodiment for detecting the temperature change of the container 112. The cover 113 includes a central through-hole 1131 through which a rod 115 is inserted into an interior of the container 112. The temperature detecting portion A1141 is mounted to a lower portion of the rod 115, and the display A1142 is mounted on a top end of the rod 115. The rod 115 includes an annular flange 1151 on an upper portion thereof. The cover 113 includes a recessed portion surrounding the through-hole 1131. When the rod 115 is extended into the interior of the container 112, a bottom of the flange 1131 is received in the recessed portion 1132. When food materials are placed into the container 112 according to the present invention and mixed, with the help of the rod 115 extending through-hole 1131 into the container 112, the temperature detecting portion A1141 detects the temperature change of the food materials in the container 112 and transmits the temperature via a signal transmission route to the display A1142 to show the temperature in the container 112. Furthermore, when a large amount of food materials is put into the container 112 for mincing and mixing, the rod 115 can be used to press the upper part of the food materials downward, such that the upper part of the food materials can be minced and mixed by the cutter blades of the juice extractor 1 within a shorter period of time, avoiding long-term operation of the juice extractor 1.

A preferred embodiment of the present invention in industry has been illustrated and described. Nevertheless, equivalent modifications and variations of the present invention are still within the scope of the present invention.

The invention claimed is:

1. A juice extractor with a temperature displaying function comprising a body, characterized in that: the body includes a base and a container, a cover is mounted on a top end of the container, a temperature display device is mounted to the body, the temperature display device includes a temperature detecting portion and a display, the temperature detecting portion is capable of detecting a temperature in an interior of the container, the display is mounted to an outer surface of the body, the temperature detecting portion is connected to the display via a signal transmission route;

with the cover including a through-hole, with a rod extending through the through-hole into the interior of the container, with the temperature detecting portion mounted to a lower portion of the rod, with the display mounted to a top end of the rod.

2. The juice extractor with a temperature displaying function as claimed in claim 1, with the temperature display device mounted to the container, with the container including a peripheral wall and a bottom wall, with the display mounted to an outer surface of the peripheral wall.

3. The juice extractor with a temperature displaying function as claimed in claim 1, with the rod including an annular flange on an upper portion thereof, with the cover including a recessed portion surrounding the through-hole of cover, with a bottom of the flange received in the recessed portion.

* * * * *